US000001998P2

(19) United States

(12) Statutory Invention Registration (10) Reg. No.: US H1998 H

Cameron et al. (43) Published: Nov. 6, 2001

(54) APPARATUS FOR ACCELERATING THE ONSET OF WEAR RELATED DAMAGE AND DISTRESS ON A CIRCUMFERENTIAL CAM SURFACE

(75) Inventors: Alastair Cameron, Great Wilbraham (GB); David A. Cusac, East Peoria; Marcel R. Hanard, II, Dunlap, both of IL (US)

(73) Assignee: Caterpillar Inc., Peoria, IL (US)

(21) Appl. No.: 09/204,993

(22) Filed: Dec. 2, 1998

(51) Int. Cl.[7] ..... G01M 15/00

(52) U.S. Cl. ..... 73/116

(56) References Cited

U.S. PATENT DOCUMENTS

| | | | |
|---|---|---|---|
| 3,878,064 | 4/1975 | Wiesstuch et al. | 204/1 T |
| 4,395,318 | 7/1983 | Tait et al. | 204/404 |
| 4,468,956 | 9/1984 | Merlo | 73/117.3 |
| 4,622,756 | 11/1986 | Marsden | 33/556 |
| 4,658,111 | 4/1987 | Takagi et al. | 219/125.1 |
| 4,740,428 | 4/1988 | Koike et al. | 428/549 |
| 5,122,198 | 6/1992 | von Hagen et al. | 148/651 |
| 5,370,364 | 12/1994 | Kenmoku et al. | 251/368 |
| 5,456,136 | 10/1995 | Yamashita et al. | 74/569 |
| 5,625,958 | 5/1997 | DeCoursey et al. | 33/555 |
| 5,699,159 | 12/1997 | Mason | 356/351 |

*Primary Examiner*—Daniel T. Pihulic

(74) *Attorney, Agent, or Firm*—Kathleen M. Ryan; Calvin E. Glastetter

(57) ABSTRACT

Apparatus for accelerating the onset of wear related damage on a circumferential cam surface including a structure for supporting a camshaft including the circumferential cam surface, a plurality of rollers having respective circumferential roller surfaces, and structures supporting the rollers at respective locations adjacent the structure for supporting the camshaft for positioning the circumferential roller surfaces for circumferential rotating contact with the circumferential cam surface. The apparatus includes a mechanism operable for rotating the camshaft with the circumferential cam surface and the circumferential roller surfaces in the circumferential rotating contact. The apparatus further includes a mechanism for variably biasing the respective rollers against the camshaft during the circumferential rotating contact simulative of actual operating conditions. The apparatus has application for evaluating wear related conditions of cams, rollers and other followers used for fuel injector actuation for internal combustion engines, as well as other applications such as for operation of engine intake and exhaust valves and the like.

11 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

APPARATUS FOR ACCELERATING THE ONSET OF WEAR RELATED DAMAGE AND DISTRESS ON A CIRCUMFERENTIAL CAM SURFACE

TECHNICAL FIELD

This invention relates generally to apparatus for determining and evaluating the life of circumferential cam surfaces before the onset of wear related damage and distress thereon, and more particularly, to apparatus operable for rotating a cam shaft with a circumferential surface thereof in rotating biased contact with a plurality of rollers or other followers, to accelerate the onset of wear related damage and distress on the circumferential cam surface.

BACKGROUND ART

Currently, known apparatus used for determining the life expectancy of circumferential cam surfaces with respect to life shortening wear related conditions such as micro-pitting, scuffing and the like, utilize a single roller or follower biased against the circumferential cam surface as the camshaft on which the cam surface is located is rotated about an axis of the cam surface. However, such circumferential cam surfaces typically comprise a hardened, metallic material, and lubrication is provided between the cam surface and the roller or follower, such that an extremely large number of test cycles, that is, revolutions of the cam, are required, thus making tests using the known apparatus time consuming and expensive.

Accordingly, the present invention is directed to overcoming the problems as set forth above.

DISCLOSURE OF THE INVENTION

In one embodiment of the present invention, apparatus for accelerating the onset of wear related damage on a circumferential cam surface of a camshaft is disclosed, the apparatus comprising a structure for supporting the camshaft for rotation about an axis of the circumferential cam surface, a plurality of rollers having respective circumferential roller surfaces, and structures supporting the rollers at respective locations adjacent the structure for supporting the camshaft for positioning the circumferential roller surfaces for circumferential rotating contact with the circumferential cam surface, a mechanism operable for rotating the camshaft with the circumferential cam surface and the circumferential roller surfaces in circumferential rotating contact, and mechanisms operable for variably biasing the respective rollers against the camshaft during the circumferential rotating contact.

To simulate actual operating conditions wherein the wear related surface damage and/or distress is expected, the camshaft used is preferably a longitudinal section of an actual camshaft contemplated for use in the application, and the rollers and structure in support thereof are preferably actual rollers and support structures such as a rocker or roller arm contemplated for use in the application. Additionally, the speed of relative rotation between the camshaft and the plurality of rollers preferably corresponds to the speed contemplated for the application, and the range of forces biasing the rollers against the camshaft is preferably the same.

Here, it should be understood that under actual operating conditions, a thin oil film will be present on both the circumferential cam surface and the circumferential roller surfaces for lubrication purposes during the circumferential rotating contact. Accordingly, corresponding lubrication is preferably provided during operation of the present apparatus.

BRIEF DESCRIPTION OF THE DRAWINGS

For a better understanding of the invention, reference may be made to the accompanying drawings in which.

BEST MODE FOR CARRYING OUT THE INVENTION

Figure 1:
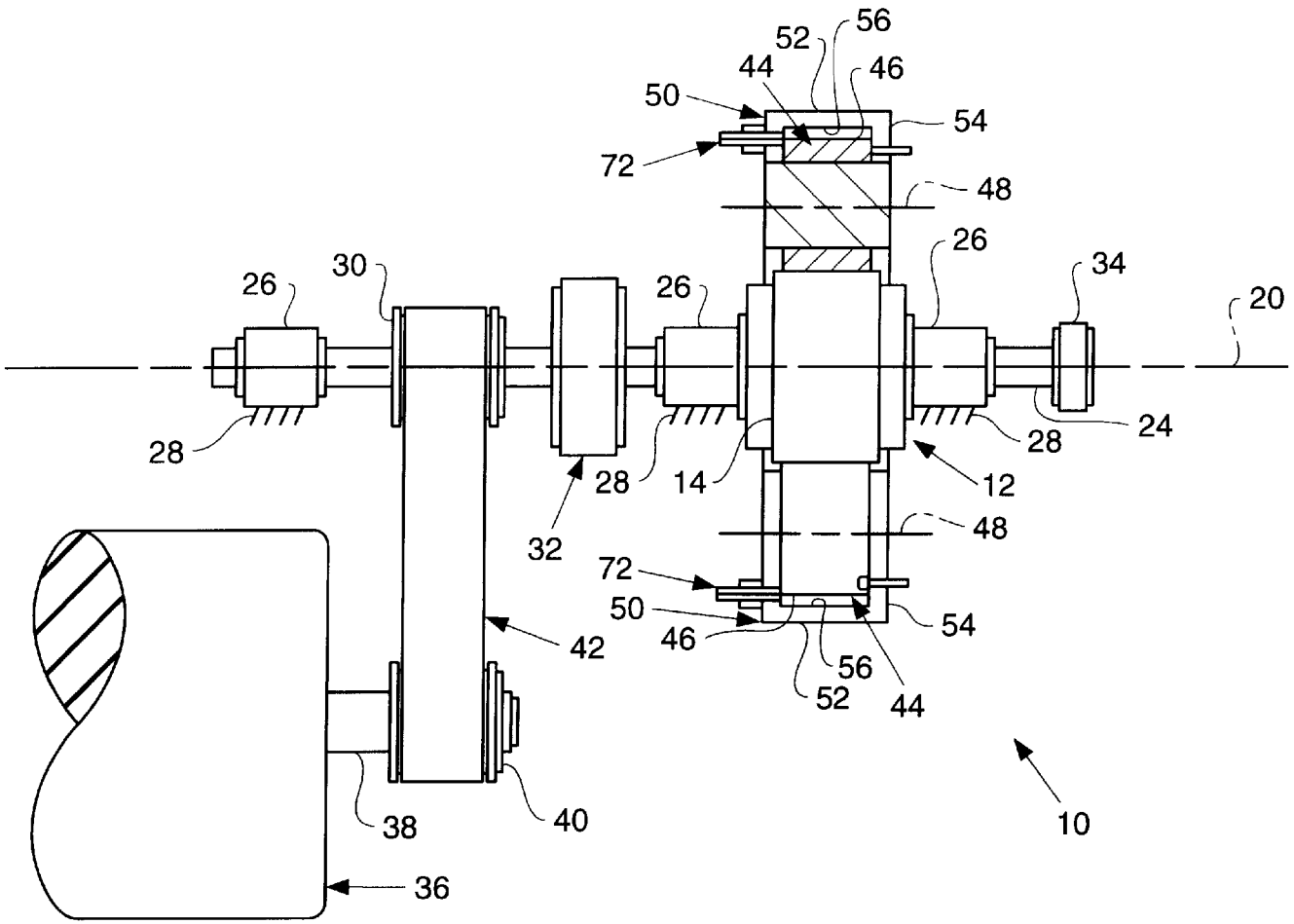
FIG. 1 is a top view in partial cross section of apparatus for accelerating the onset of wear related damage on a circumferential cam surface according to the present inventions.
Figure 2:
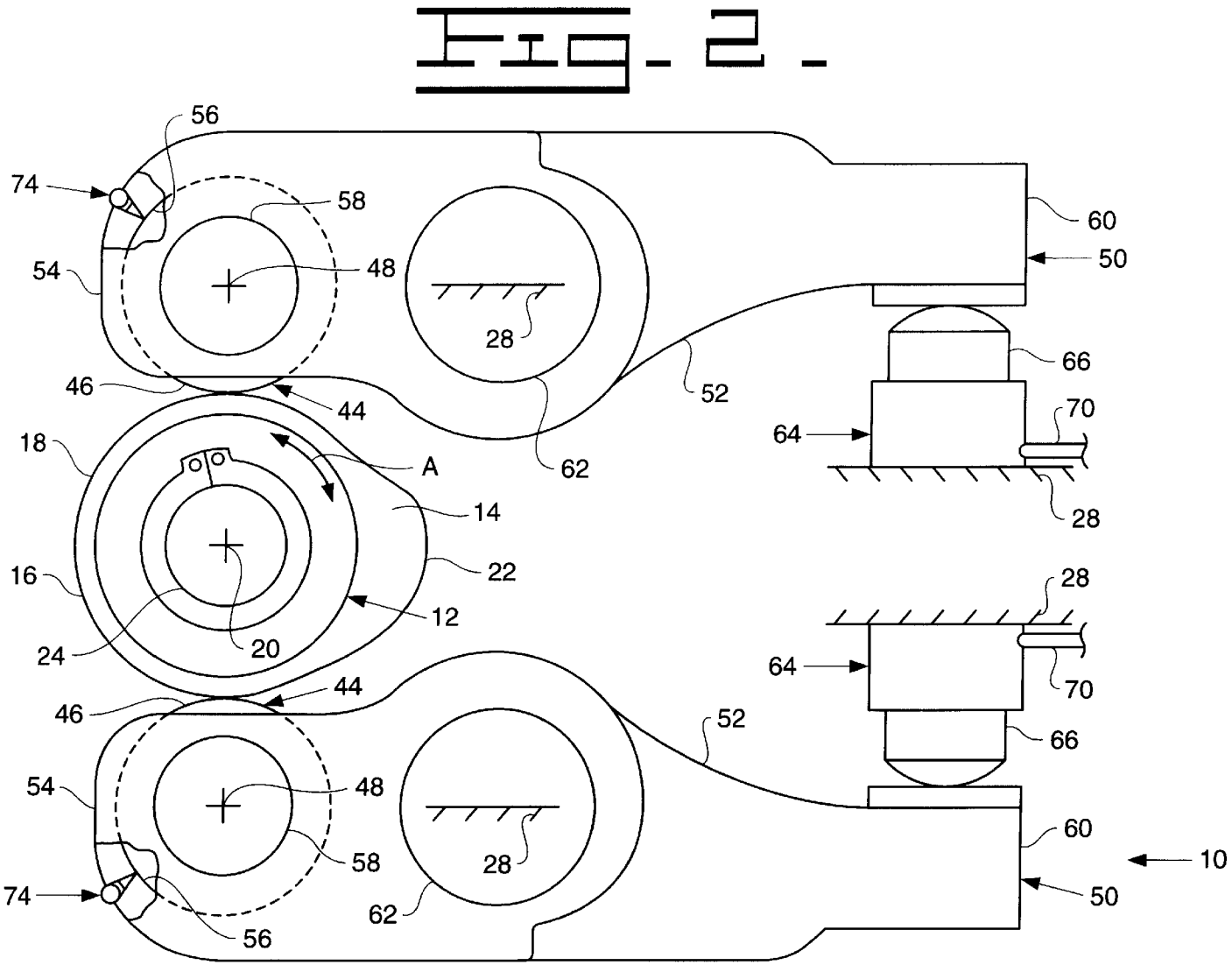
FIG. 2 is an end view of the apparatus of FIG. 1.

Referring now to the drawings, wherein several preferred embodiments of apparatus according to the present invention are shown, FIGS. 1 and 2 show one preferred embodiment of apparatus 10 for accelerating the onset of wear related conditions on a circumferential cam surface constructed and operable according to teachings of the present invention. Apparatus 10 is shown in rotatably supportive relation to a segment of a typical prior art camshaft 12 constructed of a metallic material and including a cam portion 14 operable in lubricated rotating contact with a roller or other follower of a rocker arm assembly or other componentry of an internal combustion engine for controlling the actuation of a fuel injector of the engine (not shown). Briefly, cam portion 14 has a hardened circumferential cam surface 16 including a concentric portion 18 concentric with a central longitudinal axis 20 through cam shaft 12, and a contiguous lobe portion 22 eccentric about axis 20, cam shaft 12 being representative of a wide variety of well known, conventional camshaft constructions.

Apparatus 10 includes a structure for supporting camshaft 12 and a mechanism for rotating camshaft 12 about axis 20 thereof, the mechanism including a drive shaft 24 rotatably supported by a plurality of bearings 26 mounted in alignment on a frame 28 (represented schematically) of apparatus 10. Drive shaft 24 further includes a first pulley 30 mounted therearound for rotation therewith, an optional torsion transducer 32, and a rotational speed transducer 34. Apparatus 10 includes a drive source for rotating drive shaft 24, which drive source includes a drive motor 36 having an output shaft 38 on which a second pulley 40 is mounted for rotation therewith. An endless drive belt 42 extends around first pulley 30 and second pulley 40 in frictional engagement therewith to enable drive motor 36 to rotate drive shaft 24 and camshaft 12 about axis 20.

Apparatus 10 additionally includes a plurality of metallic rollers 44 including respective hardened circumferential roller surfaces 46 concentric about a longitudinal axis 48. Rollers 44 are supported for rotation about respective axis 48 thereof by respective structures 50 for maintaining circumferential roller surfaces 46 in circumferential rotating contact with circumferential cam surface 16. Structure 50 supporting each roller 44 includes a rocker arm 52 of conventional construction having a first end 54 including a cavity 56 containing roller 44 supported for rotation on a roller shaft 58. Each rocker arm 52 includes a second end 60 opposite first end 54, and is pivotally mounted about a rocker shaft 62 mounted to frame 28 intermediate first end 54 and second end 60. Apparatus 10 further includes a mechanism 64 operable to variably bias each roller 44 against camshaft 12, here the preferred mechanism being a hydraulic lifter 66 mounted to frame 28 and positioned to exert a biasing force against second end 60 of each respective rocker arm 52 as shown. Here, it should be recognized and understood that other mechanisms and members operable for variably biasing rollers 44, individually against camshaft 12 can be used, which members can include, but are not limited to, cam operated springs, levers, and the like.

Figure 3:
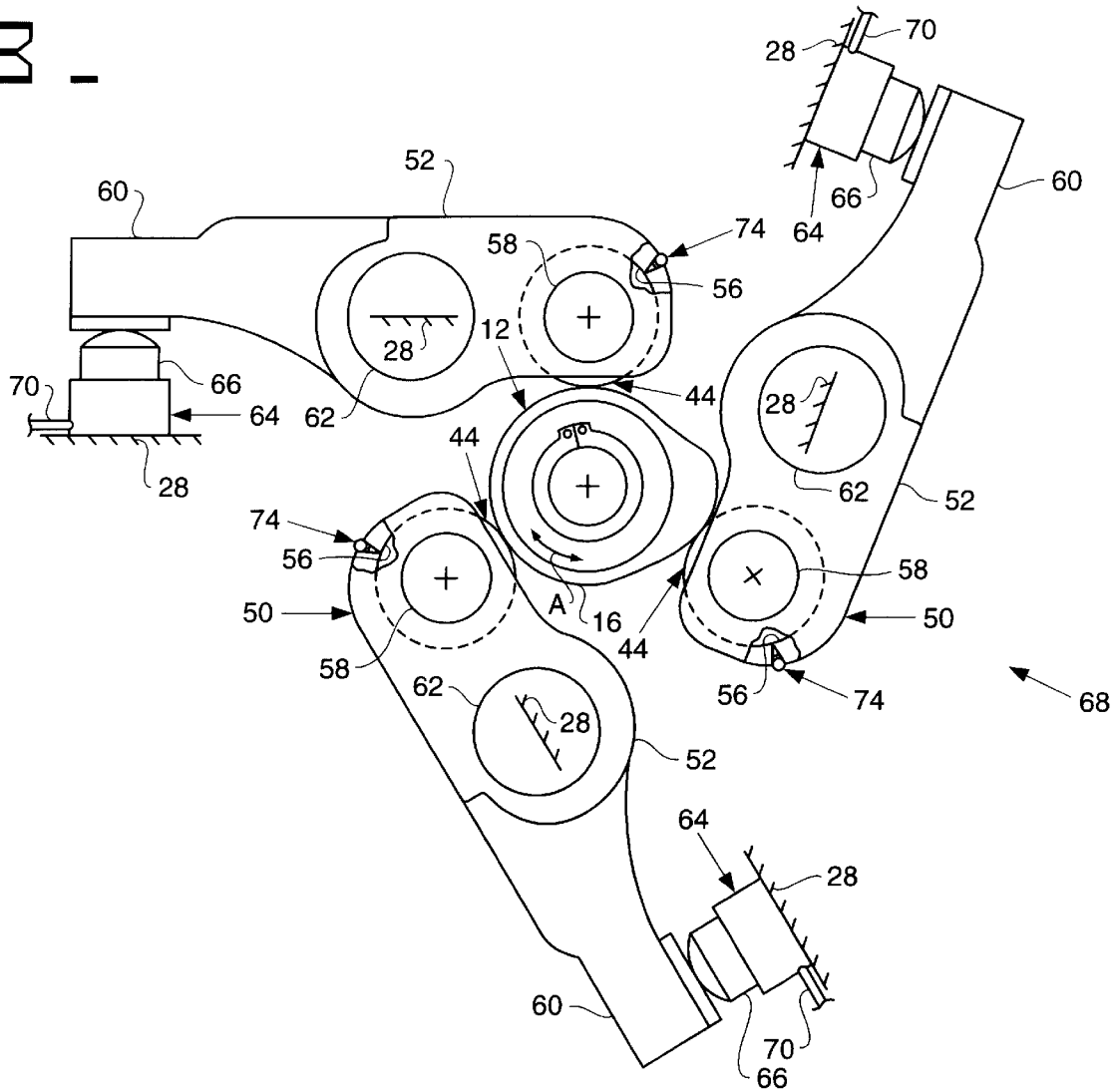
FIG. 3 is an end view of alternative apparatus for accelerating the onset of wear related damage on a cam surface according to the present invention.

Referring to FIG. 3, a second embodiment 68 of apparatus for accelerating the onset of wear related conditions such as pitting and the like on a cam surface is shown. Like parts of apparatus 68 and apparatus 10 are identified by like numerals. Apparatus 68 differs from apparatus 10 chiefly in that it utilizes three rollers 44, rollers 44 being supported by respective structures 50 in rotating contact with circumferential cam surface 16 of camshaft 12 at angularly spaced locations therearound. Each structure 50 includes a rocker arm 52 having a first end 54 including a cavity 56 in which the roller 44 thereof is supported for rotation on a roller shaft 58, and an opposite second end 60, the rocker arm 52 being pivotable about a rocker shaft 62 mounted to frame 28 as discussed above. Also, mechanisms 64 for variably biasing the respective rollers 44 against cam shaft 12 are included, the preferred mechanism 64 again including a hydraulic lifter 66 mounted to frame 28 and operable to apply a biasing force against second end 60 of each rocker arm 52.

Referring to FIGS. 1–3, in operation as camshaft 12 of apparatus 10 or apparatus 66 is rotated in either direction about longitudinal axis 20 as denoted by the arrow identified by the letter A in FIGS. 2 and 3, circumferential roller surfaces 46 of rollers 44 will be biased against concentric portion 18 of circumferential cam surface 16 by hydraulic lifters 66, with sufficient force for maintaining continuous contact therebetween lubricated by an oil film (not shown) on the surfaces. Importantly, as each roller 44 encounters lobe portion 22 of circumferential cam surface 16, rocker arm 52 in supportive relation to the roller 44 will pivot about rocker shaft 62, and a greater biasing force will be applied by hydraulic lifter 66 against second end 60 of the rocker arm 52 such that the roller 44 is biased against the lobe portion 22 with a correspondingly greater force as the roller 44 passes thereover. This can be accomplished using hydraulic circuitry (not shown) operable using well known principles for variably pressurizing hydraulic fluid and routing the pressurized fluid to lifter 66 via a hydraulic line 70 (FIGS. 2 and 3) such as under control of a hydraulic actuator valve available from Moog Automotive Inc. of St. Louis, Mo. (not shown) or the like. The ability to vary the biasing force is important as it allows simulating actual applications wherein the contact force between the cam and the roller are substantially greater as the roller passes over the cam lobe portion and less as the roller passes over the concentric portion.

For applications such as determining the onset of wear related surface conditions on cams used for such purposes as fuel injector actuation, wherein the biasing force applied by a roller or other follower can range from as small as a few hundred pounds to as much as 10,000 pounds or more during bleed down of the injector, using only a single roller or other follower, testing has been found to require 30 days or more of continuous rotational test cycles before the onset of wear related damage and/or distress such as pitting is evident. Using the present apparatus 10 and 68, the test period has been found to be reduced by a factor generally corresponding to the additional number of rollers used.

To determine the occurrence of the onset of the accelerated wear related damage and distress on the circumferential cam surface 16 and/or one or more of the circumferential roller surfaces 46, suitable conventional methods and means can be used, including, but not limited to, visual inspection, accelerometry, relative speed analysis, torsional analysis, and/or metallic contact potential. Briefly, for accelerometry, an accelerometer (not shown) of conventional construction and operation can be place in proximity to one or more of rollers 44 or structure 50 in support thereof for detecting minute vibrational occurrences indicative of metallic contact between circumferential cam surface 16 and one or more of circumferential roller surfaces 46 through the oil film therebetween. Relative speed analysis can utilize data from rotational speed transducer 34 on drive shaft 24 which monitors camshaft speed, relative to speed of one or more rollers 44, which can be monitored with optical speed pick-up sensors 72 (FIG. 1) or the like in the conventional manner. Further, for torsional analysis, torsion transducer 32 can be used to detect increased frictional resistance to rotation between camshaft 12 and rollers 44. Still further an electrical potential can be applied across the rotating contact between circumferential cam surface 16 and circumferential roller surface 46 of one or more of rollers 44, using suitable contact potential devices such as devices 74 (FIGS. 2 and 3), the oil film between the circumferential surfaces serving as a resistor and metallic contact between the surfaces causing a change in the potential indicative of damage to one or both of the surfaces.

INDUSTRIAL APPLICABILITY

The present apparatus for accelerating the onset of wear related damage and distress on a circumferential cam surface has applicability for analysis of the onset of failure conditions on both cam and roller surfaces, as well as other followers used in rotating contact with a cam, including cams used in high force applications such as the fuel injector cam application discussed above, and lower force applications, such as cams, followers and rollers for opening and closing intake and exhaust valves in communication with the combustion chamber of an internal combustion engine.

Other aspects, objects and advantages of the present invention can be obtained from a study of the drawings, the disclosure and the appended claims.

What is claimed is:

1. Apparatus for accelerating the onset of wear related damage on a circumferential cam surface, comprising:

a structure for supporting a camshaft including the circumferential cam surface for rotation about an axis of the circumferential cam surface;

a plurality of rollers including respective circumferential roller surfaces, and structures supporting the rollers at respective locations adjacent the structure for supporting the camshaft for positioning the circumferential roller surfaces for circumferential rotating contact with the circumferential cam surface;

a mechanism operable for rotating the camshaft with the circumferential cam surface in circumferential rotating contact with the circumferential roller surfaces; and mechanisms operable for variably biasing the respective rollers against the camshaft during the circumferential rotating contact.

2. Apparatus, as set forth in claim 1, further comprising a device operable for detecting changes in at least one characteristic of the circumferential rotating contact between the circumferential cam surface and at least one of the circumferential roller surfaces indicative of the onset of the wear related damage.

3. Apparatus, as set forth in claim 2, further comprising:

a device operable for applying a potential across the circumferential rotating contact between the circumferential cam surface and the at least one of the circumferential roller surfaces, wherein the at least one characteristic comprises the potential.

4. Apparatus, as set forth in claim 1, wherein the mechanisms operable for variably biasing the respective rollers against the camshaft comprise hydraulic lifters.

5. Apparatus, as set forth in claim 4, wherein the structures supporting the respective rollers each comprise a pivotally mounted rocker arm having one end supporting the roller and an opposite end in contact with the respective hydraulic lifter.

6. Apparatus, as set forth in claim 1, wherein the mechanisms operable for variable biasing the rollers against the camshaft are operable to bias the respective rollers against the camshaft with forces variable within a range of from about 100 pounds to about 10,000 pounds.

7. Apparatus, as set forth in claim 1, wherein the plurality of rollers are located at uniform angularly spaced locations around the structure for supporting the camshaft.

8. Apparatus, as set forth in claim 7, comprising at least three of the rollers.

9. Apparatus, as set forth in claim 7, comprising two of the rollers.

10. Apparatus, as set forth in claim 1, wherein the structure for supporting the camshaft supports the camshaft for rotation about an axis therethrough and further comprises a drive motor operable for rotating the camshaft.

11. Apparatus, as set forth in claim 6, wherein the camshaft comprises as axis, the circumferential cam surface comprises a concentric portion concentric about the axis and a lobe portion eccentric about the axis, and the mechanisms operable for variably biasing the rollers against the camshaft are operable to bias the respective rollers against the camshaft with a force of from about 2000 pounds to about 10,000 pounds when the circumferential roller surfaces are in circumferential rotating contact with the lobe portion of the circumferential cam surface and a substantially lesser force when the circumferential roller surfaces are in circumferential rotating contact with the concentric portion thereof.

* * * * *